United States Patent
Yamada et al.

(10) Patent No.: US 8,657,171 B2
(45) Date of Patent: Feb. 25, 2014

(54) CONNECTING ROD FRACTURE SPLITTING APPARATUS AND FRACTURE SPLITTING METHOD

(75) Inventors: Shigenori Yamada, Shizuoka (JP); Osahiko Horii, Shizuoka (JP); Toshiyuki Matsuno, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 359 days.

(21) Appl. No.: 13/022,024

(22) Filed: Feb. 7, 2011

(65) Prior Publication Data
US 2011/0219613 A1 Sep. 15, 2011

(30) Foreign Application Priority Data
Mar. 10, 2010 (JP) ................................. 2010-053463

(51) Int. Cl.
*B26F 3/00* (2006.01)
(52) U.S. Cl.
USPC ............................................ 225/103; 225/93
(58) Field of Classification Search
USPC ........................................ 225/2, 96, 103–105
See application file for complete search history.

(56) References Cited

U.S. PATENT DOCUMENTS

| | | | | |
|---|---|---|---|---|
| 4,932,127 A | * | 6/1990 | Burke | 30/308.1 |
| 5,115,564 A | * | 5/1992 | Miessen et al. | 29/888.09 |
| 5,169,046 A | | 12/1992 | Miessen et al. | |
| 5,263,622 A | * | 11/1993 | Henzler et al. | 225/103 |
| 5,568,891 A | * | 10/1996 | Hoag et al. | 225/93 |
| 5,974,663 A | * | 11/1999 | Ikeda et al. | 29/888.09 |
| 6,125,536 A | * | 10/2000 | Spurny | 29/888.09 |
| 6,457,621 B1 | * | 10/2002 | Hahnel et al. | 225/103 |
| 6,474,526 B1 | * | 11/2002 | Hahnel et al. | 225/100 |
| 6,961,997 B2 | * | 11/2005 | Kubota et al. | 29/888.09 |
| 7,299,716 B2 | * | 11/2007 | Nakajima et al. | 74/593 |
| 2002/0023939 A1 | * | 2/2002 | Hase | 225/2 |
| 2002/0042992 A1 | | 4/2002 | Rivard et al. | |
| 2002/0125286 A1 | * | 9/2002 | Jones et al. | 225/103 |
| 2004/0025340 A1 | | 2/2004 | Kubota et al. | |
| 2004/0134957 A1 | * | 7/2004 | Guirgis | 225/1 |
| 2006/0231164 A1 | * | 10/2006 | Ishida et al. | 148/206 |
| 2006/0289593 A1 | * | 12/2006 | Guirgis | 225/2 |

(Continued)

FOREIGN PATENT DOCUMENTS

| | | |
|---|---|---|
| CN | 2536835 Y | 2/2003 |
| CN | 1475678 A | 2/2004 |

(Continued)

OTHER PUBLICATIONS

Krohn DE4442062 Translation from EPO.*

(Continued)

*Primary Examiner* — Sean Michalski
(74) *Attorney, Agent, or Firm* — Troutman Sanders LLP (57) ABSTRACT

A fracture splitting jig is fitted into a crank pin hole of a connecting rod, and a fracture load is applied in a longitudinal direction of the connecting rod via the fracture splitting jig to thereby fracture a big end of the connecting rod. A mandrel as the fracture splitting jig is divided into four parts to be separable from each other in a longitudinal direction of the connecting rod and in a direction orthogonal to the longitudinal direction. When the big end is fractured, a fractured portion thereof is allowed to come in contact with a predetermined portion of the fracture splitting jig.

3 Claims, 6 Drawing Sheets

(56) References Cited

U.S. PATENT DOCUMENTS

| | | | |
|---|---|---|---|
| 2008/0061100 A1* | 3/2008 | Hansch et al. | 225/96 |
| 2009/0108041 A1* | 4/2009 | Jo | 225/103 |
| 2010/0193123 A1* | 8/2010 | Kawamata | 156/293 |
| 2011/0219613 A1* | 9/2011 | Yamada et al. | 29/888.09 |
| 2011/0283985 A1* | 11/2011 | Valerio | 125/40 |

FOREIGN PATENT DOCUMENTS

| | | |
|---|---|---|
| CN | 101307796 A | 11/2008 |
| DE | 4442062 A1 | 5/1996 |
| EP | 0713741 B1 | 5/1996 |
| JP | 3-14904 A | 1/1991 |
| JP | 10128483 A | 5/1998 |
| WO | 2006/103373 A1 | 10/2006 |

OTHER PUBLICATIONS

Chinese Office Action, dated Dec. 26, 2012, which issued during the prosecution of Chinese Patent Application No. 201110064350.0.

German Office Action, dated Oct. 22, 2012, which issued during the prosecution of German Patent Application No. 10 2011 001 060.2.

* cited by examiner

SEC. I-I

FIG. 10

CONNECTING ROD FRACTURE SPLITTING APPARATUS AND FRACTURE SPLITTING METHOD

CROSS-REFERENCE TO RELATED APPLICATIONS

This application is based upon and claims the benefit of priority of the prior Japanese Patent Application No. 2010-053463, filed on Mar. 10, 2010, the entire contents of which are incorporated herein by reference.

BACKGROUND OF THE INVENTION

1. Field of the Invention

The present invention relates to a fracture splitting apparatus and a fracture splitting method for a fracture-split connecting rod, which are used when fabricating a part, particularly a connecting rod, used in an automobile engine or the like.

2. Description of the Related Art

A big end of a connecting rod used in an automobile engine or the like is split into a connecting rod body and a cap (a split half part on the opposite side of a small end) for assembly with a crank pin. As a method for splitting the big end, there has been proposed a manufacturing method of fracture splitting type for improving precision in positioning of the connecting rod body and the cap (Japanese Laid-open Patent Publication No. H03-014904).

In the conventional fracture splitting method, a pair of splitting jigs (hereinafter referred to as a mandrel) in a semi-cylindrical shape, which are movable in a direction of small end of the connecting rod and in a direction opposite thereto, is fitted into a big end of the connecting rod, and a wedge is driven between these jigs, to thereby split the connecting rod.

Figure 8:
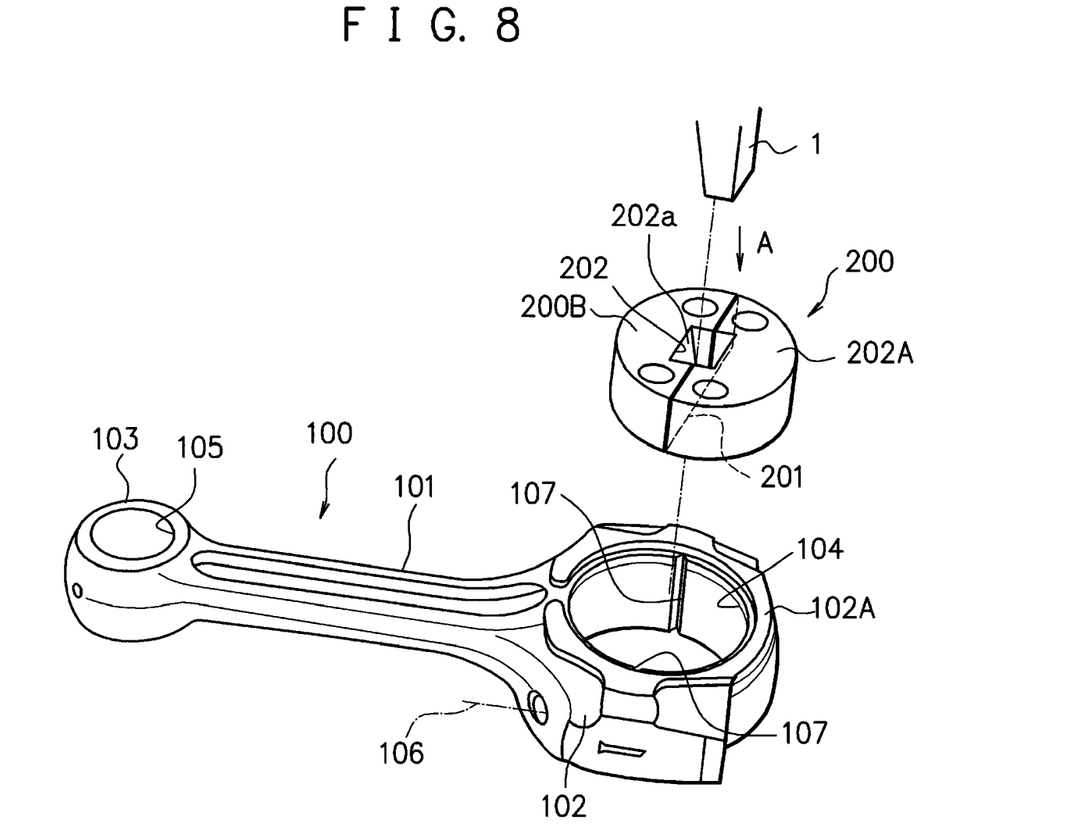
FIG. 8 is a perspective view for explaining a conventional connecting rod fracture splitting apparatus.
Figure 9A:
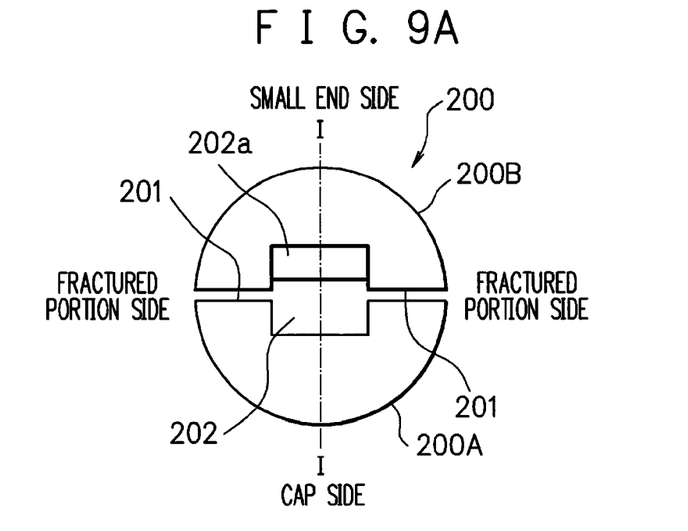
FIG. 9A and FIG. 9B are a plan view and a cross-sectional view illustrating a structural example of a mandrel related to a conventional connecting rod fracture splitting apparatus.
Figure 9B:
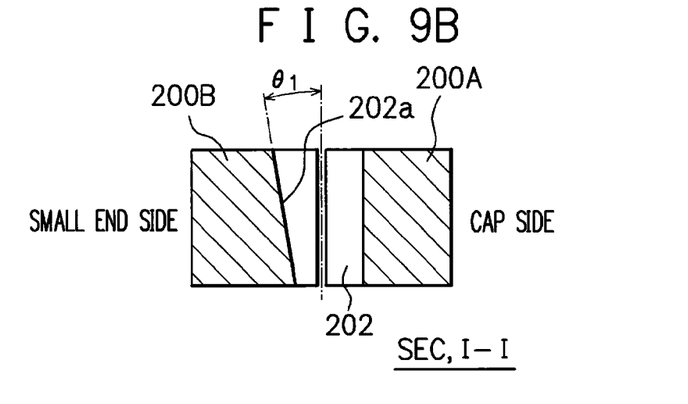
Figure 10:
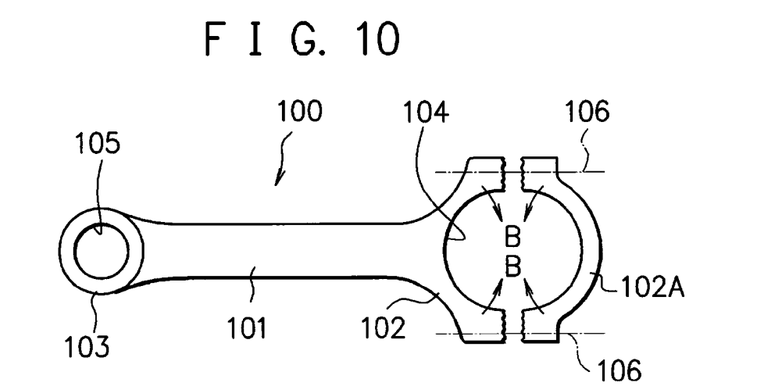
FIG. 10 is a view illustrating a state of a connecting rod fractured by the conventional connecting rod fracture splitting apparatus and a crank pin hole thereof.

Here, a specific fracture splitting method which is performed conventionally will be described with reference to FIG. 8 to FIG. 10. In these views, first a connecting rod 100 has a big end 102 and a small end 103 on both ends of a connecting rod body 101. In the big end and the small end, there are formed a crank pin hole 104 and a piston pin hole 105, respectively. After being formed by forging, a cap 102A is integrated with the big end 102 as illustrated in FIG. 8, but the cap is separated from the connecting rod body 101 as illustrated in FIG. 10 by fracture splitting with the mandrel 200 of the fracture splitting apparatus. In addition, after being split, the cap 102A is fixed to the connecting rod body 101 by fastening with bolts 106 on both sides of the crank pin hole 104.

In the above-described case, the mandrel 200 is formed to be divided into a pair of semi-cylindrical bodies 200A, 200B, which oppose each other on their coupling faces 201, and is fitted entirely into the crank pin hole 104 of the connecting rod 100 in a cylindrical shape as the whole. A wedge hole 202 having a tapered face 202a for driving a wedge 1 of the fracture splitting apparatus is formed in an axial direction of the crank pin in a center portion of the mandrel 200. Here, the inclination angle of the tapered face 202a is denoted by $\theta_1$ (see FIG. 9B). On the other hand, in an inner peripheral face of the crank pin hole 104 of the connecting rod 100, for example a pair of V-shaped notch grooves 107 is formed in advance in the axial direction of the crank pin at opposite positions in a diametrical direction thereof. By driving the wedge 1 with a high pressure into the wedge hole 202 of the mandrel 200 fitted into the crank pin hole 104 (arrow A in FIG. 8), the big end 102 is fractured along the notch grooves 107.

However, when the mandrel 200 with simple semi-cylindrical shapes as described above is used for fracture splitting, plastic deformation as shown by arrows B in FIG. 10 occurs when the connecting rod is fractured. This plastic deformation causes, referring to FIG. 6, the vicinities of fractured portions to be in the form entering the sides of the crank pin hole 104 as shown by dotted arrows and dotted lines in the true circle shape of the crank pin hole 104 after being split. As a result, circularity after being fractured may be deteriorated. Further, normally there is a correlation between the circularity after being fracture split and the circularity after being assembled with a crank pin, and thus also the circularity after being assembled with the crank pin may be deteriorated. When the circularity of the crank pin hole 104 is deteriorated in this manner, this deterioration may cause increase in friction or seizure of a connecting rod bearing, and may even cause worsening of noise while the engine is operating due to the increased friction.

SUMMARY OF THE INVENTION

In view of such a situation, it is an object of the present invention to provide a connecting rod fracture splitting apparatus and a fracture splitting method which achieve high circularity of a crank pin hole and ensure smooth operation of an engine, and the like.

A connecting rod fracture splitting apparatus according to the present invention includes a fracture splitting jig, fitting the fracture splitting jig into a crank pin hole of a connecting rod, and applying a fracture load in a longitudinal direction of the connecting rod via the fracture splitting jig to thereby fracture a big end of the connecting rod. In the connecting rod fracture splitting apparatus, the fracture splitting jig is formed to be divided into four parts to be separable from each other in a longitudinal direction of the connecting rod and in a direction orthogonal to the longitudinal direction, and when the big end is fractured, a fractured portion thereof is allowed to come in contact with a predetermined portion of the fracture splitting jig.

In the connecting rod fracture splitting apparatus of the present invention, the fracture splitting jig is formed of quarter cylindrical bodies which are divided corresponding respectively to the longitudinal direction of the connecting rod and the direction orthogonal to the longitudinal direction.

In the connecting rod fracture splitting apparatus of the present invention, a tapered face with a predetermined inclination angle is formed on a side in the direction orthogonal to the longitudinal direction of the connecting rod in a wedge hole of the fracture splitting jig.

In the connecting rod fracture splitting apparatus of the present invention, an inclination angle of a tapered face formed on a side in the longitudinal direction of the connecting rod in the wedge hole is set larger than the inclination angle of the tapered face formed on the side in the direction orthogonal to the longitudinal direction of the connecting rod.

A connecting rod fracture splitting method according to the present invention includes fitting a fracture splitting jig into a crank pin hole of a connecting rod, and applying a fracture load in a longitudinal direction of the connecting rod via the fracture splitting jig to thereby fracture a big end of the connecting rod. In the connecting rod fracture splitting method, when the big end is fractured, a predetermined portion of the fracture splitting jig is moved in a direction orthogonal to the longitudinal direction of the connecting rod to cause a fractured portion of the big end to come in contact with the predetermined portion, thereby preventing the fractured portion from entering a side of the crank pin hole.

DETAILED DESCRIPTION OF THE PREFERRED EMBODIMENTS

Hereinafter, a preferred embodiment of a connecting rod fracture splitting apparatus according to the present invention will be described using the same reference numerals for elements which are substantially the same as or correspond to those in the conventional example based on the drawings.

First, also in this embodiment, as already described (see FIG. 8 and FIG. 10), a connecting rod 100 has a big end 102 and a small end 103 on both ends of a connecting rod body 101. In the big end and the small end, there are formed a crank pin hole 104 and a piston pin hole 105, respectively. After being formed by forging, a cap 102A is integrated with the big end 102 as illustrated in FIG. 8, but the cap is separated from the connecting rod body 101 by splitting with the splitting apparatus. In an inner peripheral face of the crank pin hole 104 of the connecting rod 100, for example a pair of V-shaped notch grooves 107 is formed in advance in an axial direction of a crank pin (a direction orthogonal to a longitudinal direction of the connecting rod) at opposite positions in a diametrical direction thereof.

Figure 1:
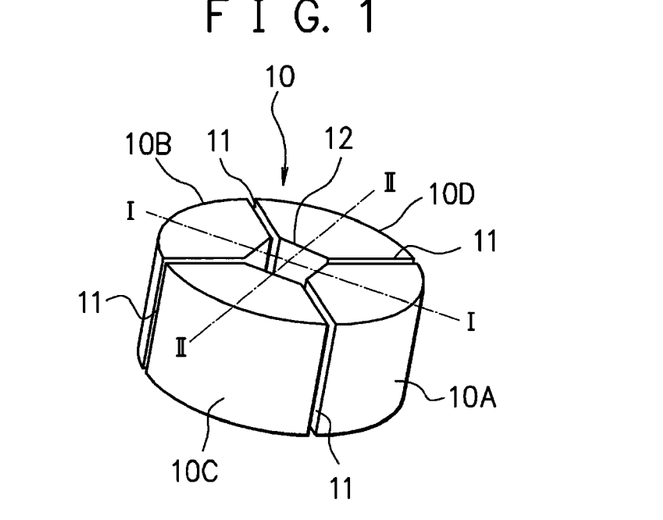
FIG. 1 is a perspective view illustrating a typical example of a mandrel related to a connecting rod fracture splitting apparatus according to the present invention.
Figure 2:
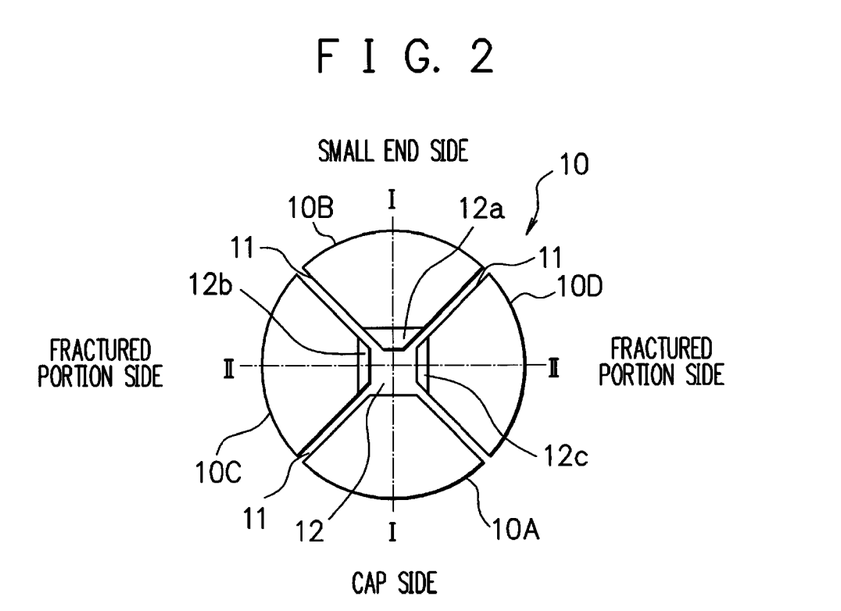
FIG. 2 is a plan view illustrating a structural example of the mandrel related to the connecting rod fracture splitting apparatus according to the present invention.

FIG. 1 illustrates an example of a mandrel 10 used in the connecting rod fracture splitting apparatus according to the present invention. The mandrel 10 has a cylindrical shape as the whole, and in this example, the mandrel is formed of quarter cylindrical bodies 10A, 10B, 100, 10D which are divided into four substantially circumferentially as illustrated in FIG. 2. Among them, the quarter cylindrical bodies 10A, 10B are separable from each other in the longitudinal direction (I-I) of the connecting rod, and the quarter cylindrical bodies 100, 10D are separable from each other in the direction (II-II) orthogonal to the longitudinal direction of the connecting rod. Adjacent ones of the quarter cylindrical bodies 10A, 10B, 100, 10D oppose each other on their coupling faces 11 (in the axial direction of the crank pin), and when opposing one to the other, the bodies form a cylindrical shape as the whole to be fitted tightly in the crank pin hole 104 of the connecting rod 100.

When being fitted into the crank pin hole 104 of the connecting rod 100, the quarter cylindrical body 10A is disposed to correspond to the cap 102A side, the quarter cylindrical body 10B to the small end 103 side, and the quarter cylindrical body 100 and the quarter cylindrical body 10D to the sides of the notch grooves 107. Thus, the quarter cylindrical body 10C and the quarter cylindrical body 10D are disposed inside at least of the areas of portions in the vicinities of the notch grooves 107 to be fractured, so as to prevent, when the notch grooves 107 are fractured, fractured portions thereof from entering the sides of the crank pin hole 104, as will be described later.

Figure 3A:
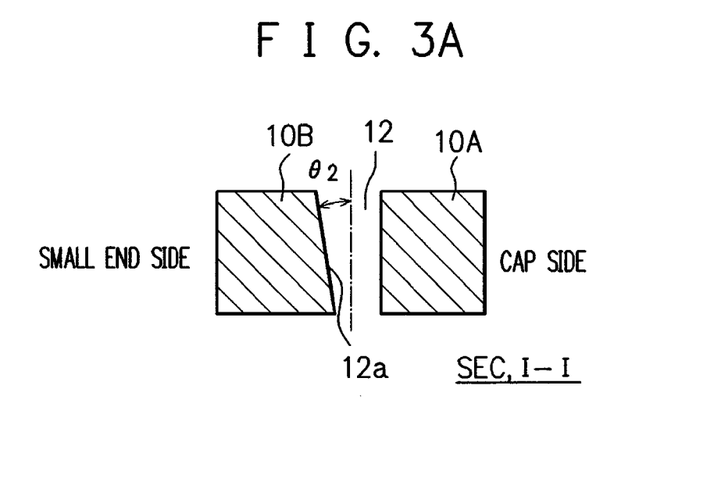
FIG. 3A and FIG. 3B are cross-sectional views taken along a line I-I and a line II-II, respectively, in FIG. 2.
Figure 3B:
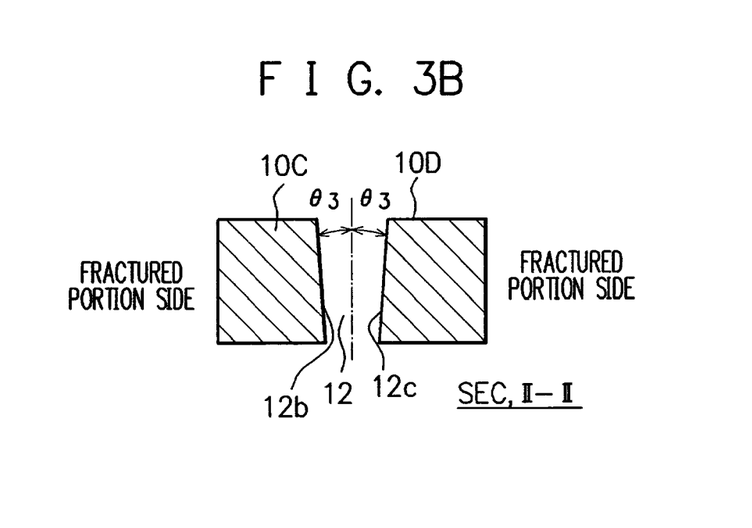

In a center portion of the mandrel 10, a tapered wedge hole 12 for driving a wedge 1 of the fracture splitting apparatus is formed in the axial direction of the crank pin. In the wedge hole 12, first as illustrated in FIG. 3A, a tapered face 12a is provided on the quarter cylindrical body 10B on the small end 103 side, and the inclination angle of this tapered face 12a is denoted by $\theta_2$. Here, in this example, the quarter cylindrical body 10A opposing the tapered face 12a has no tapered face, that is, has a straight shape. As illustrated in FIG. 3B, tapered faces 12b, 12c are provided on the quarter cylindrical bodies 100, 10D on the sides of the notch grooves 107, and the inclination angle of these tapered faces 12b, 12c is denoted by $\theta_3$. Here, $\theta_2 > \theta_3$.

Figure 4:
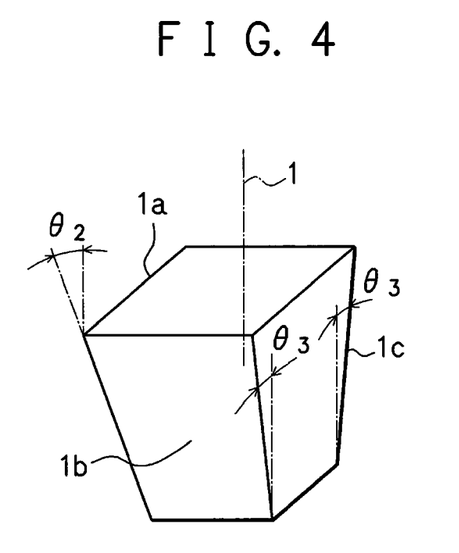
FIG. 4 is a perspective view illustrating an example of a wedge related to the connecting rod fracture splitting apparatus according to the present invention.

On the other hand, FIG. 4 illustrates a schematic structure of the wedge 1 to be driven into the wedge hole 12. Tapered faces are formed also on the wedge 1 corresponding to the wedge hole 12 on which the tapered faces are formed as described above. Specifically, the wedge has a tapered face 1a and tapered faces 1b, 1c which correspond to the tapered face 12a and the tapered faces 12b, 12c of the quarter cylindrical body 10B and the quarter cylindrical bodies 10C, 10D, and are set to inclination angles which are substantially equal to those of these tapered faces. The inclination angle of the tapered face 1a is denoted by $\theta_2$, and the inclination angle of the tapered faces 12b, 12c is denoted by $\theta_3$.

Figure 5:
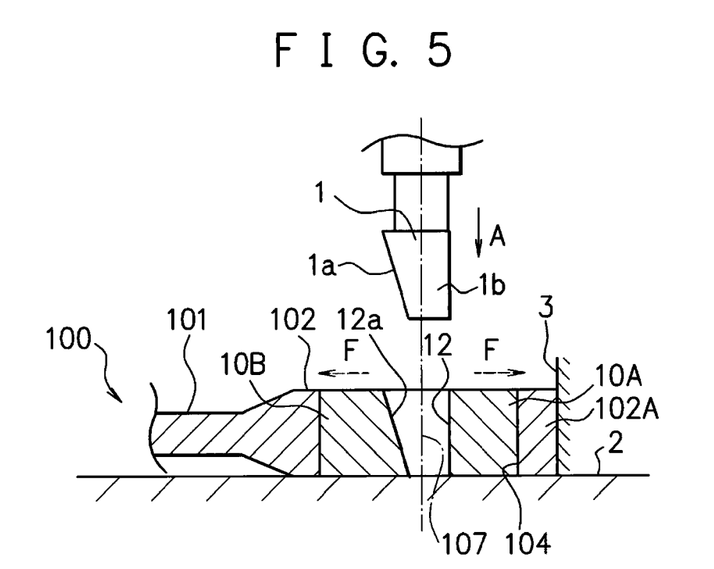
FIG. 5 is a cross-sectional view illustrating the structure of a substantial part of the connecting rod fracture splitting apparatus using the mandrel according to the present invention.

FIG. 5 illustrates the structure of a substantial part of the connecting rod fracture splitting apparatus using the mandrel 10 according to the present invention. Note that FIG. 5 illustrates one example of the apparatus, and the specific structure thereof is not limited thereto. In FIG. 5, the connecting rod 100 is set on a set plate 2 of the apparatus. In this case, the cap 102A side is fixed by a holder 3. The mandrel 10 formed of the quarter cylindrical bodies 10A, 10B, 10C, 10D is fitted in the crank pin hole 104, and when being fitted, the quarter cylindrical body 10A is disposed to correspond to the cap 102A side, the quarter cylindrical body 10B to the small end 103 side, and the quarter cylindrical body 10C and the quarter cylindrical body 10D to the sides of the notch grooves 107, respectively.

The wedge 1 is supported to be vertically movable above the wedge hole 12 disposed in the center portion of the mandrel 10 which forms a cylindrical shape with the quarter cylindrical bodies 10A, 10B, 10C, 10D. In this case, the tapered face 1a and the tapered faces 1b, 1c of the wedge 1 are disposed to correspond to the tapered face 12a and the tapered faces 12b, 12c of the quarter cylindrical body 10B and the quarter cylindrical bodies 10C, 10D.

By driving the wedge 1 in this state into the wedge hole 12 of the mandrel 10 with a high pressure, the tapered face 1a of the wedge 1 comes in contact with the tapered face 12a of the quarter cylindrical body 10B, thereby biasing the quarter cylindrical bodies 10A, 10B in the I-I direction to cause them depart from each other. Then a fracture load F is applied to the cap 102A and the big end 102 (the connecting rod body 101 side) via the quarter cylindrical bodies 10A, 10B, respectively. The big end 102 is fractured along the notch grooves 107 by operation of the fracture load F. In addition, the wedge 1 is supported to be capable of reciprocating by a driving device for the wedge 1, for example, a driving unit such as a not-illustrated hydraulic cylinder.

In the present invention, the quarter cylindrical body 10C and the quarter cylindrical body 10D are disposed to correspond to the sides of the notch grooves 107 in particular, that is, the fractured portions in the II-II direction. As described above, when the big end 102 is fracture-split by the quarter cylindrical bodies 10A, 10B, the tapered faces 1b, 1c of the wedge 1 come in contact with the tapered faces 12b, 12c of the quarter cylindrical bodies 10C, 10D, thereby pushing and displacing the quarter cylindrical bodies 10C, 10D outward in radial directions, respectively. In this manner, by the quarter cylindrical body 10C and the quarter cylindrical body 10D being disposed inside of the notch grooves 107 to be fractured and moving outward moderately, when the notch grooves 107 are fractured, the fractured portions thereof are prevented from entering the sides of the crank pin hole 104.

Accompanying driving of the wedge 1 into the wedge hole 12 as described above, the quarter cylindrical bodies 10C, 10D are pushed outward in the radial directions simultaneously as the quarter cylindrical body 10B is pushed to the small end 103 side. In this case, the inclination angles of the tapered face 12a of the quarter cylindrical body 10B and the tapered faces 12b, 12c of the quarter cylindrical bodies 10C, 10D are set to $\theta_2 > \theta_3$. Thus, the quarter cylindrical bodies 10A, 10B on the I-I direction sides with the larger inclination angle substantially participate in fracture splitting of the big end 102. Meanwhile, the quarter cylindrical body 10C and the quarter cylindrical body 10D in the II-II direction sides move also, but they just prevent the fractured portions of the notch grooves 107 from entering the sides of the crank pin hole 104 and do not affect the fracture itself.

Figure 6:
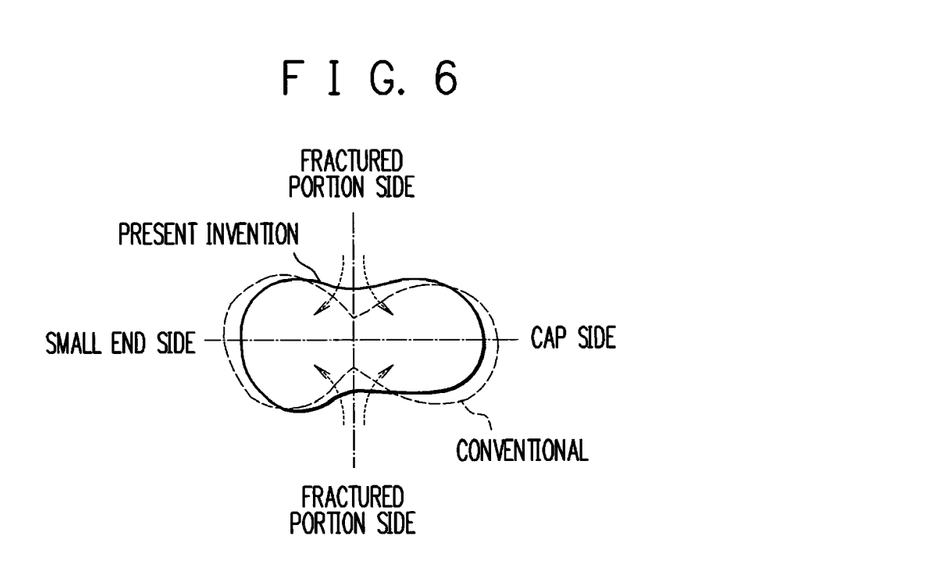
FIG. 6 is a view illustrating the shape of circularity of a crank pin hole after a connecting rod is fractured by the connecting rod fracture splitting apparatus of the present invention.

According to the present invention, it is possible to prevent, as shown by solid lines in FIG. 6, the vicinities of connecting rod fractured portions from entering the sides of the crank pin hole 104 in the true circle shape of the crank pin hole 104 after being fracture split. Thus, it is possible to suppress deterioration of the circularity after being fractured, and thereby the circularity after being assembled with a crankshaft can be improved.

Here, verification was performed with an example using a non-heat treated steel based on an SC material as the connecting rod 100. As a dimension of the connecting rod, the diameter Φ of the crank pin hole 104 is 60 mm.

The fracture splitting includes processes of forming the connecting rod body and the cap integrally as one piece by forging, performing rough processing (of the true circle in the big end, thrust faces, bolt holes, and so on), forming notches (the notch grooves 107) in the big end, fracture splitting with the mandrel 10, fastening the connecting rod body 101 and the cap 102A with bolts, finishing the big end 102, and assembling with a crankshaft.

Particularly, as the shape of the mandrel 10, the inclination angle $\theta_2$ of the tapered face 12a of the quarter cylindrical body 10B is 7°, and the inclination angle $\theta_3$ of the tapered faces 12b, 12c of the quarter cylindrical bodies 10C, 10D is 1°.

In addition, for comparison, the inclination angle $\theta_1$ of the tapered face 202a of the conventional mandrel 200 (see FIG. 9, and so on) is 7°.

From results of performing fracturing, improvements of both the circularity after being fracture split and the circularity after re-assembly simulating assembling with a crankshaft were recognized. The following Table 1 shows results of measuring the circularity after being fractured and the circularity after re-assembly simulating assembling with a crankshaft of both the mandrel 200 with the conventional shape and the mandrel 10 with the improved shape of the present invention. Among them, in the case of the conventional mandrel 200, the circularity of the big end 102 after being fractured is 37.9 (μm) as in Table 1, whereas in the case of the mandrel 10 of the present invention, the circularity after being fractured is 27.7 (μm) as in Table 1. Further, the circularity after re-assembly is 8.7 (μm) in the conventional case, which is 6.7 (μm) in the case of the mandrel 10 of the present invention.

TABLE 1

|  | CONVENTIONAL APPARATUS (μm) | PRESENT INVENTION (μm) |
| --- | --- | --- |
| AFTER FRACTURE | 37.9 | 27.7 |
| RE-ASSEMBLY SIMULATING ASSEMBLING | 8.7 | 6.7 |

Figure 7:
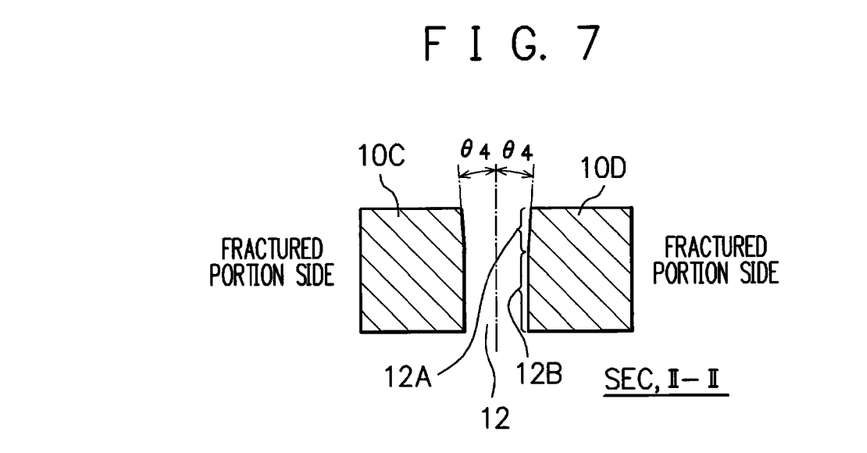
FIG. 7 is a cross-sectional view illustrating a modification example of the mandrel related to the connecting rod fracture splitting apparatus according to the present invention.

Now, FIG. 7 further shows another example of the mandrel 10 used in the connecting rod fracture splitting apparatus of the present invention. Also in this example, the mandrel 10 is formed of quarter cylindrical bodies 10A, 10B, 10C, 10D. Among them, particularly the quarter cylindrical bodies 10C, 10D each have a tapered face 12A on an upper part of the wedge hole 12 with an inclination angle $\theta_4$. Further, a lower part of the tapered face 12A is formed as a straight face 12B, that is, not tapered.

Also in this example, by providing the tapered face 12A on the upper part of the wedge hole 12 in each of the quarter cylindrical bodies 100, 10D on the sides of the 11-11 direction, the fractured portions of the big end can be prevented from entering the sides of the crank pin hole 104 when the big end is fractured.

In the foregoing, the present invention has been described with various embodiments, but the invention is not limited to these embodiments. Modifications and the like may be made within the range of the present invention.

It is also possible to provide the quarter cylindrical body 10A with a tapered face similar to the tapered face 1a of the quarter cylindrical body 10B.

Further, the quarter cylindrical bodies 10A, 10B, 10C, 10D constituting the mandrel 10 may be formed such that, for example, ones on the sides in the I-I direction are moderately larger (in the circumferential direction) than ones on the sides in the II-II direction, besides dividing into four circumferentially.

According to the present invention, a fracture splitting jig is fitted into a crank pin hole of a connecting rod, and a fracture load is applied in a longitudinal direction of the connecting rod via the fracture splitting jig to thereby fracture a big end of the connecting rod. In a typical embodiment, the fracture splitting jig is formed of quarter cylindrical bodies which are divided in a longitudinal direction of the connecting rod and in a direction orthogonal to the longitudinal direction, and when the big end is fractured, the quarter cylindrical bodies in the orthogonal direction move outward in radial directions of a crank pin. Accordingly, fractured portions of the big end come in contact with the quarter cylindrical bodies, thereby being prevented from entering the sides of the crank pin hole. Thus, high circularity of the crank pin hole after the fracturing is achieved.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A connecting rod fracture splitting apparatus comprising:
   a fracture splitting jig that is structured to fit into a crank pin hole of a connecting rod, via the fracture splitting jig a fracture load being applied in a longitudinal direction of the connecting rod to thereby fracture a big end of the connecting rod,
   wherein the fracture splitting jig comprises four parts that are separable from each other in a longitudinal direction of the connecting rod and in a direction orthogonal to the longitudinal direction,
   wherein, in a wedge hole of the fracture splitting jig, a tapered face with a predetermined inclination angle is formed on a side of the wedge hole in a first direction of the connecting rod, and another tapered face with another predetermined inclination angle is formed on another side of the wedge hole in the direction orthogonal to the first direction of the connecting rod,
   wherein the predetermined inclination angle of the tapered face and the another predetermined inclination angle of the another tapered face are structured to have different angles from each other so that two parts of the four parts of the fracture splitting jig, which are separable in the longitudinal direction of the connecting rod, affect more to fracture splitting of the big end of the connecting rod than two parts of the four parts, which are separable in the direction orthogonal to the longitudinal direction, and
   wherein, when the big end is fractured, a fractured portion thereof is allowed to come in contact with a predetermined portion of the fracture splitting jig.

2. The connecting rod fracture splitting apparatus according to claim 1,
   wherein the fracture splitting jig is formed of quarter cylindrical bodies, each being centrally notched, which are divided corresponding respectively to the first direction of the connecting rod and the direction orthogonal to the first direction.

3. The connecting rod fracture splitting apparatus according to claim 1,
   wherein the inclination angle of the tapered face formed on the side in the first direction of the connecting rod in the wedge hole is set larger than the another inclination angle of the another tapered face formed on the another side in the direction orthogonal to the first direction of the connecting rod.

* * * * *